(12) United States Patent
Grobis et al.

(10) Patent No.: US 9,601,145 B1
(45) Date of Patent: Mar. 21, 2017

(54) HEAT-ASSISTED MAGNETIC RECORDING (HAMR) DISK WITH MULTIPLE CONTINUOUS MAGNETIC RECORDING LAYERS

(71) Applicant: HGST Netherlands B.V., Amsterdam (NL)

(72) Inventors: Michael Konrad Grobis, San Jose, CA (US); Virat Vasav Mehta, San Jose, CA (US); Gregory John Parker, San Jose, CA (US); Hal Jervis Rosen, Los Gatos, CA (US); Bruce David Terris, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 15/164,685

(22) Filed: May 25, 2016

(51) Int. Cl.
| | | |
|---|---|---|
| *G11B 5/33* | (2006.01) | |
| *G11B 11/00* | (2006.01) | |
| *G11B 5/66* | (2006.01) | |
| *G11B 5/65* | (2006.01) | |
| *G11B 5/00* | (2006.01) | |

(52) U.S. Cl.
CPC .......... *G11B 5/66* (2013.01); *G11B 5/653* (2013.01); *G11B 5/656* (2013.01); *G11B 2005/0021* (2013.01)

(58) Field of Classification Search
CPC .......... G11B 11/10586; G11B 33/1406; G11B 5/4866; G11B 5/653; G11B 5/68; G11B 5/725; G11B 5/8408; G11B 2005/0021; G11B 5/7325; G11B 5/6088; G11B 220/2508; G11B 5/4907

USPC .......... 360/313, 59, 328; 369/13.13, 13.41, 369/13.33
See application file for complete search history.

(56) References Cited

U.S. PATENT DOCUMENTS

| | | |
|---|---|---|
| 7,755,861 B1 | 7/2010 | Li et al. |
| 7,969,775 B2 | 6/2011 | Khizroev |
| 8,021,771 B2 | 9/2011 | Weller et al. |
| 8,081,542 B1 | 12/2011 | Grobis et al. |

(Continued)

OTHER PUBLICATIONS

J. Ikemoto et al., "Control of Curie Temperature of FePt(Cu) Films Prepared From Pt(Cu)/Fe Bilayers", IEEE Transactions on Magnetics, vol. 44, Issue 11, Nov. 2008, pp. 3543-3546.

(Continued)

*Primary Examiner* — Nabil Hindi
(74) *Attorney, Agent, or Firm* — Thomas R. Berthold

(57) ABSTRACT

A heat-assisted magnetic recording (HAMR) disk has multiple independent data layers, each data layer being a continuous non-patterned layer of magnetizable material. Each data layer can store data independent and not related to the data stored in the other data layers. The data layers are separated by a nonmagnetic spacer layer (SL) and each data layer is formed of high-anisotropy ($K_u$) material so that the coercivities of lower and upper data layers (RL1 and RL2) are greater than the magnetic write field. At a high laser power both RL1 and RL2 are heated to above their respective Curie temperatures and data is recorded in both RL1 and RL2. At low laser power only upper RL2 is heated to above its Curie temperature and data is recorded only in RL2. The SL prevents lower RL1 from being heated to above its Curie temperature at low laser power.

20 Claims, 4 Drawing Sheets

(56) References Cited

U.S. PATENT DOCUMENTS

| | | |
|---|---|---|
| 8,164,940 B2 | 4/2012 | Ozatay et al. |
| 8,507,114 B2 | 8/2013 | Peng et al. |
| 8,705,325 B2 | 4/2014 | Matsumoto |
| 8,705,327 B2 | 4/2014 | Matsumoto |
| 9,218,850 B1 | 12/2015 | Wang et al. |
| 9,443,545 B2 * | 9/2016 | Mosendz ............. G11B 5/7325 |
| 2005/0157597 A1 | 7/2005 | Sendur et al. |
| 2010/0149676 A1 | 6/2010 | Khizorev et al. |
| 2015/0138939 A1 | 5/2015 | Hellwig et al. |

OTHER PUBLICATIONS

S.D. Willoughby, "Electronic and magnetic properties of Fe1-xCuxPt", J. Appl. Phys. 95, 6586 (2004).

J. Thiele et al., "Temperature dependent magnetic properties of highly chemically ordered Fe55-xNixPt45L10 films", J. Appl. Phys. 91, 6595 (2002).

O. Hovorka et al., "The Curie temperature distribution of FePt granular magnetic recording media", Appl. Phys. Lett. 101, 052406 (2012).

Toshiba's 3-D Magnetic Recording May Increase Hard Disk Drive Capacity, Forbes Magazine, Jul. 9, 2015 http://www.forbes.com/sites/tomcoughlin/2015/07/09/3d-magnetic-recording/.

* cited by examiner

HEAT-ASSISTED MAGNETIC RECORDING (HAMR) DISK WITH MULTIPLE CONTINUOUS MAGNETIC RECORDING LAYERS

RELATED APPLICATION

This application is related to concurrently-filed U.S. patent application Ser. No. 15/164,636 titled "HEAT-ASSISTED MAGNETIC RECORDING (HAMR) DISK DRIVE WITH DISK HAVING MULTIPLE CONTINUOUS MAGNETIC RECORDING LAYERS".

BACKGROUND OF THE INVENTION

Field of the Invention

This invention relates generally to a heat-assisted magnetic recording (HAMR) type of magnetic recording hard medium, and more particularly to a HAMR magnetic recording disk with multiple continuous magnetic recording layers.

Description of the Related Art

In conventional magnetic recording hard disk drives, the recording layer on the disk is a continuous film of magnetic material. The recorded data "bits" are composed of multiple weakly-coupled neighboring magnetic grains that form a single magnetic domain and are physically adjacent to one another. In contrast to continuous media, patterned media, also called "bit-patterned media" or BPM, have been proposed wherein the magnetic material in the recording layer is patterned into small isolated data islands. Each island contains a single magnetic "bit" and is separated from neighboring islands by a nonmagnetic region.

In conventional continuous magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature, i.e., the temperature above which the material becomes paramagnetic. The recorded data is then read back at ambient temperature by a conventional magnetoresistive read head. HAMR disk drives have been proposed for both conventional continuous media and for BPM.

In a typical HAMR write head, light from a laser diode is coupled to a waveguide that guides the light to a near-field transducer (NFT) (also known as a plasmonic antenna). A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the air-bearing surface (ABS) of the air-bearing slider that also supports the read head and magnetic write pole and rides or "flies" above the disk surface. NFTs are typically formed of a low-loss metal (e.g., Au, Ag, Al, Cu) shaped in such a way to concentrate surface charge motion at a notch or tip located at the slider ABS when light is incident. Oscillating tip charge creates an intense near-field pattern that heats the recording layer on the disk. The magnetic write pole is then used to change the magnetization of the recording layer while it cools. Sometimes the metal structure of the NFT can create resonant charge motion (surface plasmons) to further increase intensity and disk heating. For example, when polarized light is aligned with an E-antenna type of NFT, an intense near field pattern is created at the notch or tip of the E-antenna. Resonant charge motion can occur by adjusting the E-antenna dimensions to match a surface plasmon frequency to the incident light frequency. A NFT with a generally triangular output end, sometimes called a "nanobeak" type of NFT, is described in U.S. Pat. No. 8,705,325 B2 and U.S. Pat. No. 8,705,327 B2, both assigned to the same assignee as this application. In this type of NFT an evanescent wave generated at a surface of the waveguide couples to surface plasmons excited on the surface of the NFT and a strong optical near-field is generated at the apex of the triangular output end.

Multilevel HAMR media have been proposed to increase the data density, but for BPM. In multilevel HAMR BPM each data island is formed of multiple stacked cells, so the data density is increased by a factor of $2^{(n-1)}$, where n is the number of cells in each island. For example, if there are two cells in each island the recorded bits in the two cells are thus aligned vertically to provide a composite readback signal which is decoded into one of 4 possible values. U.S. Pat. No. 8,081,542 B1, assigned to the same assignee as this application, describes a disk drive with multilevel HAMR BPM having two stacked magnetic cells in each data island.

What is needed is a HAMR disk with multiple continuous non-patterned magnetic recording layers wherein the recording layers are independent and thus do not require vertical alignment of the recorded data bits in the different layers.

SUMMARY OF THE INVENTION

In embodiments of this invention the HAMR disk has multiple independent data layers, each data layer being a continuous non-patterned layer of magnetizable material. In a two-data layer embodiment, data can be stored in just one or both of the data layers. Each data layer can store data independent and not related to the data stored in the other data layer so there is no requirement that the magnetized regions or bits in one data layer be vertically aligned with the bits in the other data layer. The data layers are separated by a nonmagnetic spacer layer (SL) and each data layer is formed of high-anisotropy ($K_u$) material so that the coercivities ($H_{C1}$ and $H_{C2}$) of lower and upper data layers (RL1 and RL2) are greater than the magnetic write field ($H_W$) at normal disk drive operating temperature when the data layers are not intentionally being written to. This assures that the recorded magnetic bits have high thermal stability. If the laser is operating at a higher power level ($P_H$) that heats both RL1 and RL2 to above their respective Curie temperatures, data is recorded in both RL1 and RL2. If the laser is operating at a lower power level ($P_L$) that heats only upper RL2 to above its Curie temperature, data is recorded only in RL2. The SL has a thermal conductivity and thickness that prevents lower RL1 from being heated to near or above its Curie temperature ($T_{C1}$) when the laser is operating at a lower power level ($P_L$).

In a first embodiment, RL1 and RL2 may have substantially the same Curie temperature ($T_{C1}$ $T_{C2}$) and substantially the same coercivity ($H_{C1}$ z $H_{C2}$), for example by having substantially the same chemical composition. In a second embodiment, lower RL1 has a higher Curie temperature than upper RL2 ($T_{C1}>T_{C2}$) and a higher coercivity than upper RL2 ($H_{C1}>H_{C2}$). In a third embodiment, lower RL1 has a lower Curie temperature than upper RL2 ($T_{C1}<T_{C2}$) and a lower coercivity than upper RL2 ($H_{C1}<H_{C2}$).

For a fuller understanding of the nature and advantages of the present invention, reference should be made to the following detailed description taken together with the accompanying figures.

DETAILED DESCRIPTION OF THE INVENTION

Figure 1:
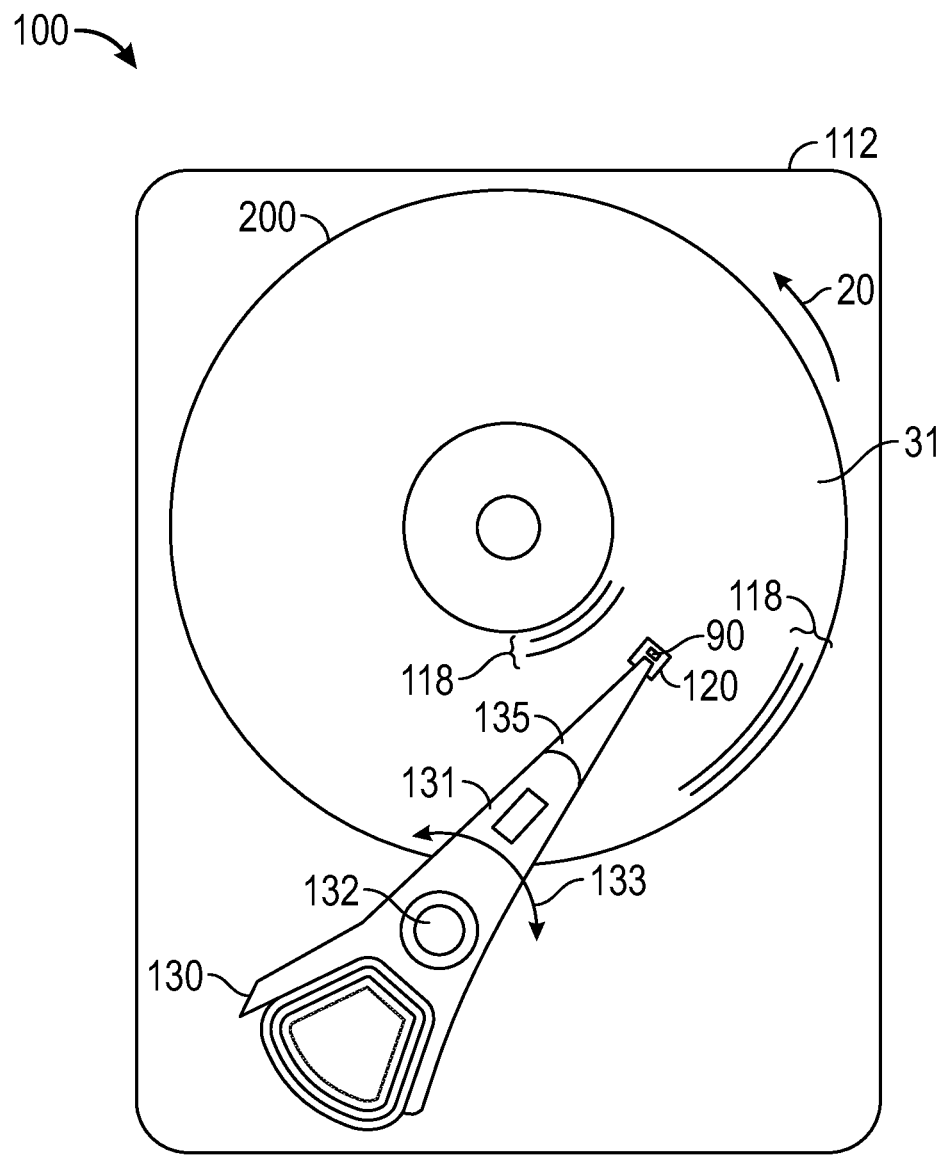
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
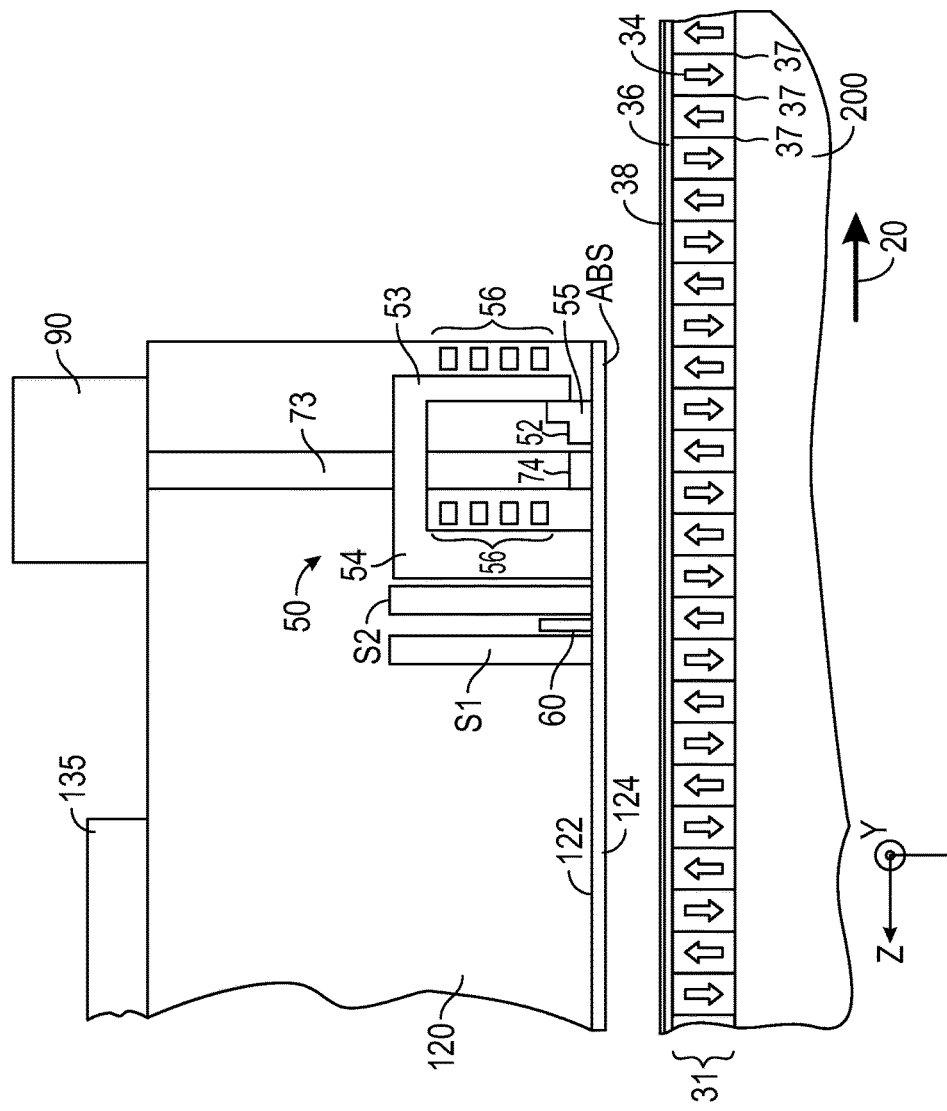
FIG. 2 depicts a sectional view, not drawn to scale because of the difficulty in showing the very small features, of an air-bearing slider for use in HAMR disk drive and a portion of a HAMR disk according to the prior art.

In the following drawings, the X direction denotes a direction perpendicular to the air-bearing surface (ABS) of the slider, the Y direction denotes a track width or cross-track direction, and the Z direction denotes an along-the-track direction. FIG. 2 is a schematic cross-sectional view illustrating a configuration example of a HAMR head according to the prior art. In FIG. 2, the disk 200 is depicted with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluoropolyether (PFPE).

The air-bearing slider 120 is supported by suspension 135. The slider 120 has a recording-layer-facing surface 122 onto which an overcoat 124 is deposited. The overcoat 124 is typically a DLC overcoat with a thickness in the range of about 10 to 30 Å and whose outer surface forms the ABS of the slider 120. An optional adhesion film or undercoat (not shown), such as a 1 to 5 Å silicon nitride ($SiN_x$) film, may be deposited on the surface 122 before deposition of the overcoat 124. The slider 120 supports the magnetic write head 50, read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The NFT 74, also known as a plasmonic antenna, typically uses a low-loss metal (e.g., Au, Ag, Al or Cu) shaped in such a way to concentrate surface charge motion at a tip located at the slider ABS when light from the waveguide 73 is incident. Oscillating tip charge creates an intense near-field pattern, heating the recording layer 31. Sometimes, the metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120. The laser 90 is typically capable of operating at different power levels. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide.

In embodiments of this invention the HAMR disk has multiple independent data layers, each data layer being a continuous non-patterned layer of magnetizable material. In a two-data layer embodiment, data can be stored in just one or both of the data layers. The data layers are independent in that there is no requirement that the magnetized regions or bits in one data layer be vertically aligned with the bits in the other data layers. Each data layer can store data independent and not related to the data stored in the other data layer. Each data layer is formed of high-anisotropy ($K_u$) material so that the coercivities ($H_{C1}$ and $H_{C2}$) of lower and upper data layers (RL1 and RL2) are greater than the magnetic write field ($H_W$) at normal disk drive operating temperature (i.e., approximately 275 to 335 K) when the data layers are not being written to. This assures that the recorded magnetic bits have high thermal stability. If the laser is operating at a higher power level ($P_H$) that heats both RL1 and RL2 to above their respective Curie temperatures, data is recorded in both RL1 and RL2. If the laser is operating at a lower power level ($P_L$) that heats only upper RL2 to above to above its Curie temperature, data is recorded only in RL2.

Figure 3:
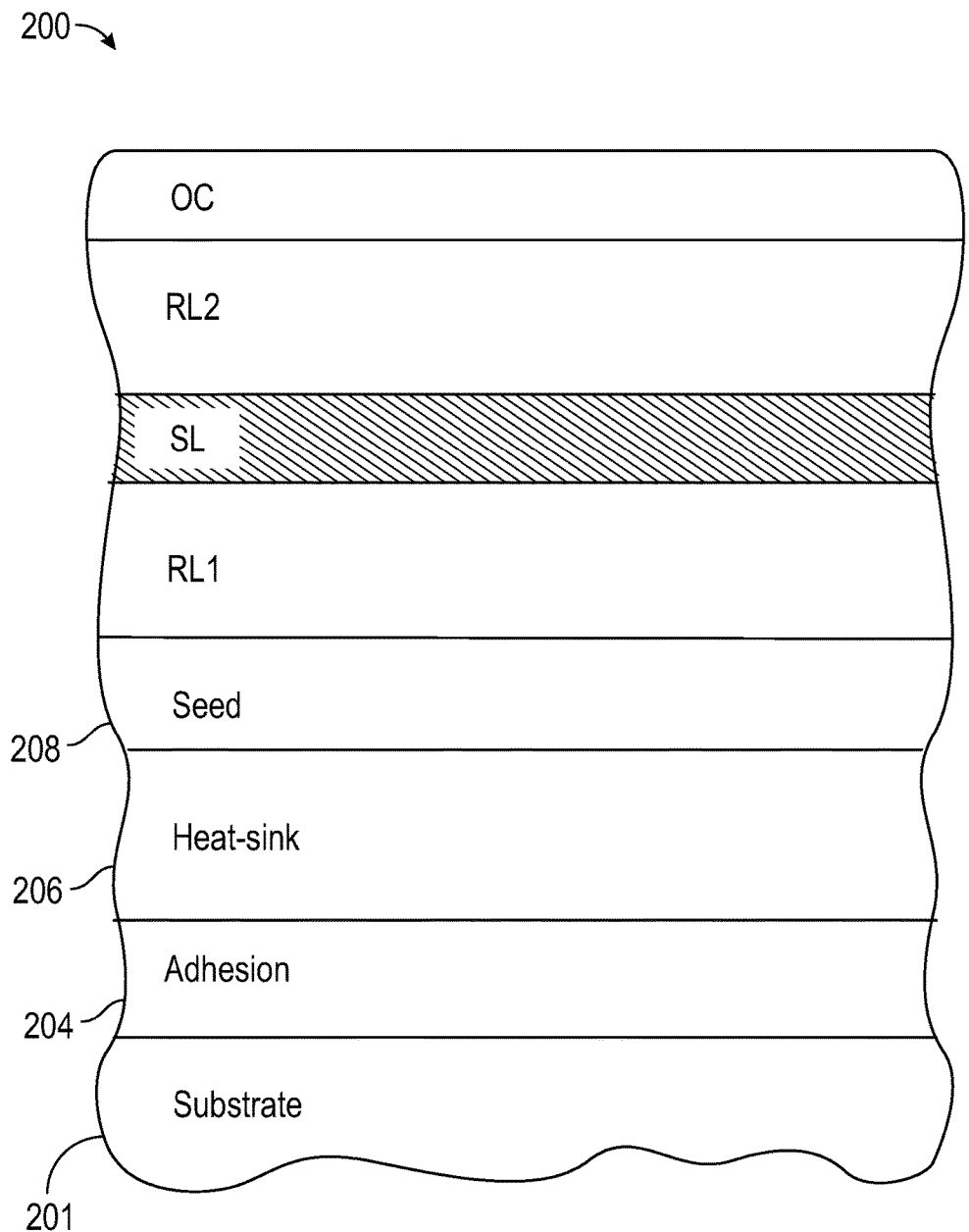
FIG. 3 is a sectional view showing a HAMR disk according to embodiments of the invention with multiple continuous non-patterned recording layers (RL1 and RL2) separated by a nonmagnetic spacer layer (SL) that magnetically decouples RL1 and RL2.

FIG. 3 is a sectional view showing a HAMR disk 200 according to embodiments of the invention with multiple continuous non-patterned recording layers (RL1 and RL2), each having a high-$K_u$, separated by a nonmagnetic spacer layer (SL) that magnetically decouples RL1 and RL2. The recording layers RL1 and RL2 may be comprised of a substantially chemically-ordered FePt alloy (or CoPt alloy) as proposed in the prior art, preferably with one or more segregants. The disk 200 is a substrate 201 having a generally planar surface on which the representative layers are sequentially deposited, typically by sputtering. The hard disk substrate 201 may be any commercially available high-temperature glass substrate, but may also be an alternative substrate, such as silicon, silicon-carbide, or AlMg alloy. An adhesion layer 204, typically about 10-200 nm of an amorphous adhesion material like a CrTa or NiTa alloy, is deposited on substrate 200.

A heat-sink layer 206, typically about 5 to 200 nm of Ag, Al, Cu, Cr, Au, NiAl, NiTa, Ru, RuAl, W, Mo, Ta or any combination of these materials, is deposited on the adhesion layer 204. The heat-sink layer 206 facilitates the transfer of heat away from the RLs to prevent spreading of heat to regions of the RLs adjacent to where data is desired to be written, thus preventing overwriting of data in adjacent data tracks.

A seed layer 208 is deposited on the heat-sink layer 206. The seed layer is typically 2-50 nm of MgO for which the 002 crystallographic orientation is chosen to determine the subsequent crystallographic orientation of the 002-oriented FePt RL1 magnetic layer whose growth is controlled by the seed layer.

The perpendicular media that forms RL1 and RL2 is a high-anisotropy ($K_u$) substantially chemically-ordered FePt alloy (or CoPt alloy) with perpendicular magnetic anisotropy. Substantially chemically-ordered FePt alloy has a composition of the form $Fe_{(y)}Pt_{(100-y)}$ where the subscripts are in atomic percent (at. %) and y is between about 45 and 55. Such alloys of FePt (and CoPt) ordered in $L1_0$ are known for their high magneto-crystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$—X, where y is between about 40 and 60 at. % and the element X may be one or more of Ni, Au, Cu, Ge, Pd, Mn and Ag and present in the range of between about 1 and 20 at. %. While the pseudo-binary alloy in general has similarly high anisotropy as the binary alloy FePt, it allows additional control over the magnetic and other properties of the RLs. For example, Ag improves the formation of the $L1_0$ phase and Cu reduces the Curie temperature. While the preferred material for the RLs is FePt or FePt—X, the RLs may alternatively be formed of a CoPt (or a pseudo-binary CoPt—X alloy based on the CoPt $L1_0$ phase).

FePt $L1_0$ phase based thin films exhibit strong perpendicular anisotropy, which potentially leads to small (e.g., 3-9 nm in diameter) thermally stable grains for ultrahigh density magnetic recording. To fabricate small grain FePt $L1_0$ media some form of segregant to separate grains can be used as an integral part of the magnetic recording layer. Thus in the HAMR disk 200, the RLs may also typically include a segregant, such as one or more of C, $SiO_2$, $TiO_2$, $Y_2O_3$, TaOx, $ZrO_2$, $VO_x$, SiC, SiN, HfC, $HfO_2$, VN, AlN, $MoO_x$, TiC, TiN, B, $B_4C$, and BN that forms between the FePt grains and reduces the grain size. The segregant concentration by volume in the RL can be from 10 to 50%, with the remainder being FePt alloy.

The spacer layer (SL) may be a nonmagnetic material that is thermally conductive, provided it is thick enough to ensure that RL1 and RL2 are magnetically decoupled. In addition, the SL needs to set the growth correctly for RL2 so that it has the correct magnetocrystalline orientation and good grain microstructure. Materials that may be used for the SL include but are not limited to dielectric materials such as magnesium oxide (MgO), magnesium titanate ($Mg_2TiO_4$), spinel ($Mg_2Al_3O_4$), barium zirconium oxide ($BaZrO_3$), barium cerium oxide ($BaCeO_3$), strontium titanate ($SrTiO_3$), strontium zirconium oxide ($SrZrO_3$), lanthanum aluminum oxide ($LaAlO_3$), titanium nitride (TiN), titanium oxynitride ($TiO_xN_{(1-x)}$), silicon nitride (SiN) and carbon (C). Other suitable materials include body-centered cubic (bcc) metals such as Cr, W, Mo, Mn, V, Nb and alloys thereof, and other metals such as Ru, Rh, Ir and alloys thereof. The material of the SL is selected so that its known thermal conductivity, in combination with its thickness, provides the desired amount of heat flow to the lower RL1 when the laser is at higher power level $P_H$ while preventing or reducing heat flow to the lower RL1 when the laser is at lower power level $P_L$. The typical thickness of the SL may be between about 1 nm and 20 nm, depending on the thermal conductivity of the SL material.

A protective overcoat (OC) may deposited on RL2, preferably to a thickness between about 1-5 nm. The OC may be a layer of amorphous carbon, like amorphous diamond-like carbon (DLC). The amorphous carbon or DLC may also be hydrogenated and/or nitrogenated, as is well-known in the art. On the completed disk, a liquid lubricant, like a perfluorpolyether (PFPE), is coated on the OC.

Figure 4A:
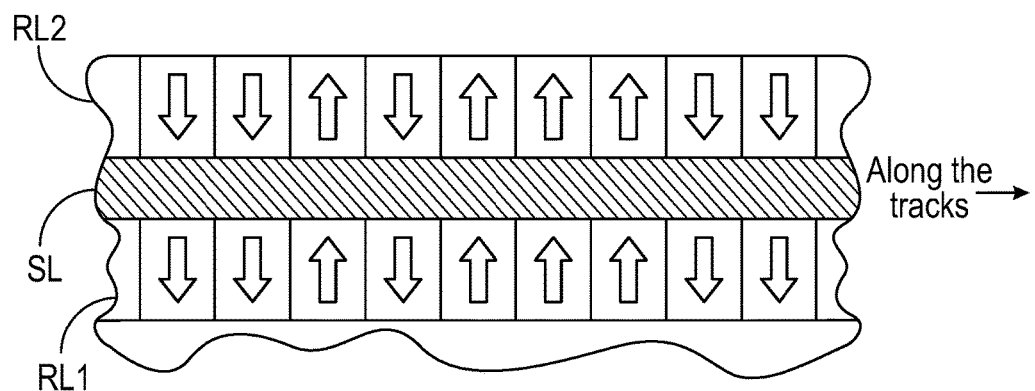
FIG. 4A is a schematic sectional view of the multiple data layer HAMR disk according to embodiments of the invention after data is written in the tracks with high laser power showing perpendicularly magnetized regions or bits in RL1 and RL2.
Figure 4B:
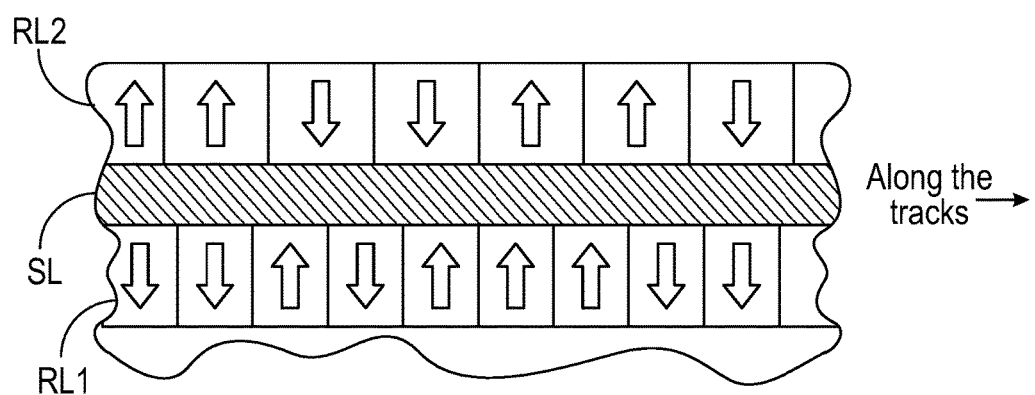
FIG. 4B is a schematic sectional view of the multiple data layer HAMR disk according to embodiments of the invention after data is written in the tracks with a lower laser power showing that the newly-written perpendicularly magnetized bits in RL2 are not vertically aligned with the previously-written perpendicularly magnetized bits in RL1.

In a first embodiment, RL1 and RL2 may have substantially the same Curie temperature ($T_{C1}$ $T_{C2}$) and substantially the same coercivity ($H_{C1}$ z $H_{C2}$), for example by having substantially the same chemical composition, while the SL has a thermal conductivity and thickness that prevents RL1 from being heated to near or above its Curie temperature ($T_{C1}$) when the laser is operating at a lower power level ($P_L$). As used herein, substantially the same Curie temperature indicates that the two values are within 3 percent of one another (~20 K). As used herein, substantially the same coercivity indicates the two values are within 10 percent of one another. It is understood that the coercivity depends on the magnetic field exposure time and temperature. Coercivities are typically measured at room temperature with long field sweep rates, even though the coercivity under recording conditions is the more relevant parameter. For example, RL1 and RL2 may each be formed of $Fe_{50}Pt_{50}$ with one or more segregants of C, BN and $SiO_2$ and with a thickness between about 5 and 15 nm. RL1 and RL2 would then each have a Curie temperature of about 740 K and a coercivity of about 50 kOe. The SL may be formed of any of the materials listed above, such as MgO or $BaZrO_3$ with a thickness between about 3 and 10 nm. In this example it is assumed the write head generates a magnetic write field $H_W$ of approximately 10 kOe and the laser generates a higher power level $P_H$ of 10 mW and a lower power level $P_L$ of 7 mW, with a 5% coupling efficiency with the output of the NFT, which can be used to write independent data to the top and bottom layers. A higher laser power level $P_H$ of 10 mW will increase the temperature of both RL1 and RL2 to more than 740 K, which will reduce $H_{C1}$ and $H_{C2}$ to approximately 0 Oe so that data will be written to both RL1 and RL2 by the write field $H_W$ as the media cools. This is depicted in the schematic sectional view FIG. 4A which shows the perpendicularly magnetized regions or bits when a data stream is written simultaneously in the data tracks in both RL1 and RL2. However, a lower laser power level $P_L$ of 7 mW will still increase the temperature of the upper RL2 to over 740 K, which will reduce $H_{C2}$ to approximately 0 Oe, but the SL will prevent the lower RL1 from being heated to near or above $T_{C1}$ so that $H_{C1}$ will not be reduced below the write field $H_W$. Thus the write field $H_w$ will not alter the magnetized regions of RL1. This is depicted in the schematic sectional view FIG. 4B which shows that the newly-written perpendicularly magnetized bits in RL2 are not vertically aligned with the previously-written perpendicularly magnetized bits in RL1 when a different data stream is written in the data track of just RL2. This is because the writing of bits to the upper RL2 with lower laser power level $P_L$ is not synchronized with the previously-written bits in RL1. Also, the writing of bits to the upper RL2 may be at a different frequency so the width of the bits in RL2 may be different from the width of the bits in lower RL1, as shown in FIG. 4B. The two data layers are thus independent of one another.

In a second embodiment, lower RL1 has a higher Curie temperature than upper RL2 ($T_{C1}>T_{C2}$). In one example, both RL1 and RL2 may each have a thickness between about 5 and 15 nm. Lower RL1 may be formed of a chemically-ordered $Fe_{50}Pt_{50}$ alloy with one or more segregants. Upper RL2 may be formed of $(Fe_{(1-x)}Cu_x)_{50}Pt_{50}$, where x is greater than or equal to 1 at. % and less than or equal to 20 at. %, and preferably greater than or equal to 5 at. % and less than or equal to 10 at. %. The SL may be formed of any of the materials listed above, such as MgO or $BaZrO_3$, with a thickness between about 2 and 10 nm. The addition of Cu to FePt, preferably by substitution for Fe, decreases the Curie temperature with only a small decrease in magnetic anisotropy. These $FeCu_xPt$ materials can be selected to have a high anisotropy field of 80-100 kOe or above for the lower RL1. Upper RL2 can have an anisotropy field of 70-90 kOe, which will yield a coercivity that is also substantially higher than the write field $H_W$ of 10 kOe. Because upper RL2 contains Cu and lower RL1 does not, $T_{C1}$ is greater than $T_{C2}$. A substantial difference in Curie temperatures of RL1 and RL2 will assure that only the magnetizations of the bits in upper RL2 will be switched in the presence of $H_w$ when the laser is at lower power level $P_L$. Generally this means there will also be a substantial difference in coercivities of RL1 and RL2 ($H_{C1}$ greater than $H_{C2}$). For example, by appropriate selection of the amount of Cu this results in upper RL2 with $H_{C2}$ of 30 kOe and $T_{C2}$ of 630 K. Lower RL1 will have $H_{C1}$ of 50 kOe and $T_{C1}$ of 740 K. Thus in the example of this second embodiment a higher laser power level $P_H$ of 10 mW will increase the temperature of both RL1 and RL2 to more than 740 K, which will reduce $H_{C1}$ and $H_{C2}$ to approximately 0 Oe so that data will be written to both RL1 and RL2 by the write field $H_W$. This is depicted in the schematic sectional view FIG. 4A which shows the perpendicularly magnetized regions or bits when a data stream is written simultaneously in the data tracks in both RL1 and RL2. However, a lower laser power level $P_L$ of 5 mW will increase the temperature of the upper RL2 to approximately 630 K, which will reduce $H_{C2}$ to approximately 0 Oe, but this temperature is below $T_{C1}$ of 740 K and the SL will further limit the temperature in RL1, so $H_{C1}$ will not be reduced below $H_W$. Thus $H_w$ will not alter the magnetized regions of RL1. This is depicted in the schematic sectional view of FIG. 4B which shows that the newly-written perpendicularly magnetized bits in RL2 are not vertically aligned with the previously-written perpendicularly magnetized bits in RL1 when a different data stream is written in the data track of just RL2. This is because the writing of bits to the upper RL2 with lower laser power level $P_L$ is not synchronized with the previously-written bits in RL1. Also, the writing of bits to the upper RL2 may be at a different frequency so the width of the bits in RL2 may be different from the width of the bits in lower RL1. The two data layers are thus independent of one another.

In the example of this second embodiment, lower RL1 is the chemically-ordered $Fe_{50}Pt_{50}$ binary alloy without Cu. However, RL1 could also be a $(Fe_{(1-x)}Cu_x)_{50}Pt_{50}$ alloy provided it contains less Cu than upper RL2 to assure that $T_{C1}$ is greater than $T_{C2}$.

In a third embodiment, lower RL1 has a lower Curie temperature than upper RL2 ($T_{C1}<T_{C2}$). In order to reduce thermal degradation of the NFT, it is desirable to keep the operating laser powers $P_H$ and $P_L$ as low as possible. Lowering $T_{C1}$ reduces the power $P_H$ required to write the lower layer and can increase the useable lifetime of the NFT. In one example, both RL1 and RL2 may each have a thickness between about 5 and 15 nm. Lower RL1 may be formed of $(Fe_{(1-x)}Cu_x)_{50}Pt_{50}$, where x is greater than or equal to 1 at. % and less than or equal to 20 at. %, and preferably greater than or equal to 5 at. % and less than or equal to 10 at. %. Upper RL2 will have less Cu than RL1 and may be formed of $(Fe_{(1-x)}Cu_x)_{50}Pt_{50}$, where x is greater than or equal to 1 at. % and less than or equal to 20 at. %, and preferably less than or equal to 10 at. %. The addition of Cu to FePt, preferably by substitution for Fe, decreases the Curie temperature with only a small decrease in magnetic anisotropy. Because the Cu content of the RL1 is higher than RL2, $T_{C1}$ is lower than $T_{C2}$. The SL may be formed of any of the materials listed above, such as MgO or $BaZrO_3$, with a thickness between about 2 and 10 nm. Generally this means there will also be a substantial difference in coercivities of RL1 and RL2 ($H_{CL}$ is less than $H_{C2}$). For example, by appropriate selection of the amount of Cu this results in upper RL2 with $H_{C2}$ of 50 kOe and $T_{C2}$ of 740 K. Lower RL1 will have $H_{C1}$ of 40 kOe and $T_{C1}$ of 690 K. The thermal resistance of the SL depends on the thickness and thermal conductivity of the SL material. The thermal resistance of the SL is selected so that the temperature drop across the SL during recording of RL2 with laser power $P_L$ is sufficiently large so that the temperature of RL1 does not exceed $T_{CL}$. A sufficient thermal resistance of SL will ensure that RL1 stays sufficiently below $T_{C1}$ so that only the magnetizations of the bits in upper RL2 will be switched in the presence of $H_w$ when the laser is at lower power level $P_L$. Thus in the example of this third embodiment a laser power level $P_H$ of 9 mW will increase the temperature of both RL1 and RL2 to more than 740 K, which will reduce $H_{C1}$ and $H_{C2}$ to approximately 0 Oe so that data will be written to both RL1 and RL2 by the write field $H_W$. This is depicted in the schematic sectional view FIG. 4A which shows the perpendicularly magnetized regions or bits when a data stream is written simultaneously in the data tracks in both RL1 and RL2. A lower laser power level $P_L$ of 7 mW will still increase the temperature of the upper RL2 to approximately 740 K, which will reduce $H_{C2}$ to approximately 0 Oe. However, the large thermal resistance of the SL will prevent RL1 from exceeding 690K, so $H_{C1}$ will not be reduced below $H_W$. Thus $H_w$ will not alter the magnetized regions of RL1. This is depicted in the schematic sectional view of FIG. 4B which shows that the newly-written perpendicularly magnetized bits in RL2 are not vertically aligned with the previously-written perpendicularly magnetized bits in RL1 when a different data stream is written in the data track of just RL2. This is because the writing of bits to the upper RL2 with lower laser power level $P_L$ is not synchronized with the previously-written bits in RL1. Also, the writing of bits to the upper RL2 may be at a different frequency so the width of the bits in RL2 may be different from the width of the bits in lower RL1. The two data layers are thus independent of one another.

While Cu is the preferred material for substitution of a portion of the Fe to reduce the Curie temperature, other materials that may be used include Ni, Cr, Mn, B and Ag. Thus the RLs may be formed of a material having a composition of the form $(Fe_{(1-x)}Z_x)_y Pt_{(100-y)}$, where Z is selected from Cu, Ni, Cr, Mn, B and Ag, x is between 1 and 20 and y is between about 45 and 55. The addition of Ni to create FeNiPt alloys, like FeCuPt alloys, also decreases the magnetocrystalline anisotropy and Curie temperature. The properties of FeCuPt alloys have been described by J. Ikemoto et al., "Control of Curie Temperature of FePt(Cu) Films Prepared From Pt(Cu)/Fe Bilayers", IEEE Transactions on Magnetics, Volume 44, Issue 11, November 2008, pp. 3543-3546; and S. D. Willoughby, "Electronic and magnetic properties of $Fe_{1-x}Cu_xPt$", *J. Appl. Phys.* 95, 6586 (2004). The properties of FeNiPt alloys have been described by J. Thiele et al., "Temperature dependent magnetic properties of highly chemically ordered $Fe_{55-x}Ni_xPt_{45}L1_0$ films", *J. Appl. Phys.* 91, 6595 (2002).

In addition to or as an alternative to the use of Cu, Ni, Cr, Mn, B or Ag to substitute for a portion of the Fe to reduce the Curie temperature of the FePt alloy, certain segregants can be added to reduce the Curie temperature. In general the use of pure carbon segregant produces the highest Curie temperatures in FePt media (740 K and greater). The use of nearly every other segregant, such as BN—$SiO_2$, will reduce the Curie temperature. (See O. Hovorka et al., "The Curie temperature distribution of FePt granular magnetic recording media", *Appl. Phys. Lett.* 101, 052406 (2012)). Thus, in one embodiment the segregant in RL1 contains more carbon than the segregant in RL2 to assure that $T_{C1}$ is greater than $T_{C2}$. In another embodiment the segregant in RL2 contains more carbon than the segregant in RL1 to assure that $T_{C2}$ is greater than $T_{C1}$.

Another technique to reduce the Curie temperature is to deposit off-stoichiometry $Fe_{(50+x)}Pt_{(50-x)}$ media in which x=1 to 10 or −10 to −1. Tc is reduced whenever x is not equal to zero.

Increasing the difference between $P_L$ and $P_H$ will increase the likelihood that RL2 can be written without altering the magnetic configuration of RL1. The SL thermal resistance is proportional to the product of the thermal resistivity of the SL multiplied by its thickness. Increasing the thickness of the SL will require an increase in $P_H$, but will potentially reduce the readback signal of RL1. The thermal resistivity is a property of the materials used in the SL, the defect density of the SL, and the interface thermal properties of the SL with RL1 and RL2. The choice of spacer layers with high thermal resistance, such as $BaZrO_3$ or $SiO_2$, will require an increase in $P_H$ and enable spacer layer thicknesses below 5 nm.

The absorption properties of RL1 and RL2 also affect the required values for $P_L$ and $P_H$. Thicker recording layers absorb proportionally more light and lower the required power to reach Tc. A larger RL2 thickness relative RL1 will require a lower $P_L$ relative to $P_H$. A practical difference in the thickness is that the thickness of RL2 is 5-25% greater than the thickness of RL1. A larger RL2 thickness will decrease the power $P_L$ required to write only RL2. In another embodiment, the thickness of RL1 is 5-25% greater than the thickness or RL2. In this embodiment $P_H$ is required to be decreased relative to $P_L$, but the NFT lifetime is increased due to the lower maximum required operating laser power.

With a small modification, the media described above can also be used as a laminated HAMR media in which the recording transitions in RL1 and RL2 are aligned to within about 5 nm of each other. In laminated media, the two (or more) magnetic layers separated by spacer layers can function as a single recording layer, as shown in FIG. 4A. For laminated HAMR media only a single laser power is required because it is not necessary to write either layer independently. Laminated HAMR media is described in U.S. Pat. No. 9,218,850 B1. For use as a laminated medium, the Curie temperatures and thicknesses of RL1 and RL2, as well as the SL thermal resistance, need to be tuned so that the magnetic orientation of the grains in RL1 and RL2 is fixed by the write field at the same down track location within +/−5 nm at the operating laser power. Using the third embodiment described above as a starting point, laminated HAMR media can be created by reducing $T_{C1}$ relative to $T_{C2}$, increasing the thickness of RL1 relative to RL2, and/or decreasing the thermal resistance of the SL. All of these changes will enable RL1 to be written simultaneously with RL2 and, when optimized, will align the magnetic transitions in RL1 and RL2.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular heat-assisted magnetic recording (HAMR) medium comprising:
    a substrate;
    a first continuous non-patterned magnetic layer comprising a substantially chemically-ordered alloy comprising Pt and one of Fe and Co on the substrate and having a plurality of regions magnetized perpendicularly to the plane of the first magnetic layer;
    a nonmagnetic spacer layer on the first magnetic layer; and
    a second continuous non-patterned magnetic layer comprising a substantially chemically-ordered alloy comprising Pt and one of Fe and Co on the spacer layer and having a plurality of regions magnetized perpendicularly to the plane of the second magnetic layer, wherein the magnetized regions of the second magnetic layer are not aligned with the magnetized regions of the first magnetic layer.

2. The medium of claim 1 wherein the material of the first magnetic layer has substantially the same coercivity ($H_C$) as the material of the second magnetic layer.

3. The medium of claim 1 wherein the material of the first magnetic layer has a Curie temperature ($T_{C1}$) substantially equal to the Curie temperature ($T_{C2}$) of the material of the second magnetic layer.

4. The medium of claim 1 wherein the material of the first magnetic layer has a Curie temperature ($T_{C1}$) greater than the Curie temperature ($T_{C2}$) of the material of the second magnetic layer.

5. The medium of claim 1 wherein the material of the first magnetic layer has a Curie temperature ($T_{C1}$) less than the Curie temperature ($T_{C2}$) of the material of the second magnetic layer.

6. The medium of claim 1 wherein at least one of the first and second magnetic layers further comprises a segregant selected from one or more of C, $SiO_2$, $TiO_2$, $Y_2O_3$, $TaO_x$, $ZrO_2$, $VO_x$, SiC, SiN, HfC, $HfO_2$, VN, AlN, $MoO_x$, TiC, TiN, B, $B_4C$, and BN.

7. The medium of claim 1 wherein at least one of the first and second magnetic layers is formed of a material based on the $L1_0$ phase and having a composition of $(Fe_{(y)}Pt_{(100-y)})$—X, where y is greater than or equal to 40 atomic percent and less than or equal to 60 atomic percent and the element X is selected from one or more of Ni, Au, Cu, Ge, Pd, Mn and Ag.

8. The medium of claim 1 wherein the alloy of at least one of the first and second magnetic layers has a composition of the form $(Fe_{(1-x)}Z_x)_y Pt_{(100-y)}$, where Z is selected from Cu, Ni, Cr, Mn, B and Ag, x is greater than or equal to 1 atomic percent and less than or equal to 20 atomic percent and y is greater than or equal to 45 atomic percent and less than or equal to 55 atomic percent.

9. The medium of claim 8 wherein the alloy of the second magnetic layer comprises a FeCuPt alloy.

10. The medium of claim 8 wherein the alloy of each of the first and second magnetic layers comprises a FeCuPt alloy wherein the amount of Cu in the second magnetic layer is greater than the amount of Cu in the first magnetic layer.

11. The medium of claim 1 wherein the nonmagnetic spacer layer is selected from magnesium oxide (MgO), magnesium titanate ($Mg_2TiO_4$), spinel ($Mg_2Al_3O_4$), barium zirconium oxide ($BaZrO_3$), barium cerium oxide ($BaCeO_3$), strontium titanate ($SrTiO_3$), strontium zirconium oxide ($SrZrO_3$), lanthanum aluminum oxide ($LaAlO_3$), titanium nitride (TiN), titanium oxynitride ($TiO_xN_{(1-x)}$), silicon nitride (SiN) and carbon (C).

12. The medium of claim 1 wherein the nonmagnetic spacer layer is selected from Cr, W, Mo, Mn, V, Nb, Ru, Rh, Ir and alloys thereof.

13. A perpendicular heat-assisted magnetic recording (HAMR) disk comprising:
    a substrate;
    a first continuous non-patterned magnetic layer on the substrate and comprising a substantially chemically-ordered alloy comprising Fe and Pt and a segregant selected from one or more of C, $SiO_2$, $TiO_2$, $Y_2O_3$, $TaO_x$, $ZrO_2$, $VO_x$, SiC, SiN, HfC, $HfO_2$, VN, AlN, $MoO_x$, TiC, TiN, B, $B_4C$, and BN, the first magnetic layer having a plurality of regions magnetized perpendicularly to the plane of the first magnetic layer and a coercivity ($H_{C1}$);
    a nonmagnetic spacer layer on the first magnetic layer; and
    a second continuous non-patterned magnetic layer on the spacer layer and comprising a substantially chemically-ordered alloy comprising Fe and Pt and a segregant selected from one or more of C, $SiO_2$, $TiO_2$, $Y_2O_3$, $TaO_x$, $ZrO_2$, $VO_x$, SiC, SiN, HfC, $HfO_2$, VN, AlN, $MoO_x$, TiC, TiN, B, $B_4C$, and BN, the second magnetic layer having a plurality of regions magnetized perpendicularly to the plane of the second magnetic layer and a coercivity ($H_{C2}$) and wherein the magnetized regions of the second magnetic layer are not aligned with the magnetized regions of the first magnetic layer.

14. The disk of claim 13 wherein the first magnetic layer has a Curie temperature ($T_{C1}$) substantially equal to the Curie temperature ($T_{C2}$) of the second magnetic layer.

15. A perpendicular heat-assisted magnetic recording (HAMR) disk comprising:
    a substrate;
    a first continuous non-patterned magnetic layer on the substrate and comprising a substantially chemically-ordered alloy comprising Fe and Pt and a segregant selected from one or more of C, $SiO_2$, $TiO_2$, $Y_2O_3$, $TaO_x$, $ZrO_2$, $VO_x$, SiC, SiN, HfC, $HfO_2$, VN, AlN, $MoO_x$, TiC, TiN, B, $B_4C$, and BN, the first magnetic layer having a plurality of regions magnetized perpendicularly to the plane of the first magnetic layer and a coercivity ($H_{C1}$);
    a nonmagnetic spacer layer on the first magnetic layer; and
    a second continuous non-patterned magnetic layer on the spacer layer and comprising a material having a composition of the form $(Fe_{(1-x)}Z_x)_y Pt_{(100-y)}$, where Z is selected from Cu, Ni, Cr, Mn, B and Ag, x is greater than or equal to 1 atomic percent and less than or equal to 20 atomic percent and y is greater than or equal to 45 atomic percent and less than or equal to 55 atomic percent, the second magnetic layer having a plurality of regions magnetized perpendicularly to the plane of the second magnetic layer and a coercivity ($H_{C2}$) wherein the magnetized regions of the second magnetic layer are not aligned with the magnetized regions of the first magnetic layer and wherein $H_{C1}$ is greater than $H_{C2}$.

16. The disk of claim 15 wherein the first magnetic layer has a Curie temperature ($T_{C1}$) greater than the Curie temperature ($T_{C2}$) of the second magnetic layer.

17. The disk of claim 15 wherein the material of the second magnetic layer comprises a FeCuPt alloy.

18. The disk of claim 15 wherein the nonmagnetic spacer layer is selected from magnesium oxide (MgO), magnesium titanate ($Mg_2TiO_4$), spinel ($Mg_2Al_3O_4$), barium zirconium oxide ($BaZrO_3$), barium cerium oxide ($BaCeO_3$), strontium titanate (SrTiO$_3$), strontium zirconium oxide (SrZrO$_3$), lanthanum aluminum oxide (LaAlO$_3$), titanium nitride (TiN), titanium oxynitride (TiO$_x$N$_{(1-x)}$), silicon nitride (SiN) and carbon (C).

19. The disk of claim 15 wherein the nonmagnetic spacer layer is selected from Cr, W, Mo, Mn, V, Nb, Ru, Rh, Ir and alloys thereof.

20. The disk of claim 15 wherein the second magnetic layer further comprises a segregant selected from one or more of C, SiO$_2$, TiO$_2$, Y$_2$O$_3$, TaOx, ZrO$_2$, VO$_x$, SiC, SiN, HfC, HfO$_2$, VN, AlN, MoO$_x$, TiC, TiN, B, B$_4$C, and BN.

* * * * *